US008260254B2

(12) United States Patent
Syrett et al.

(10) Patent No.: US 8,260,254 B2
(45) Date of Patent: Sep. 4, 2012

(54) NETWORK BILLING

(75) Inventors: Mark Syrett, Lumbin (FR); Armand Giraud, Isere (FR); Michael Bright, Isere (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1284 days.

(21) Appl. No.: 11/407,650

(22) Filed: Apr. 20, 2006

(65) Prior Publication Data

US 2006/0258331 A1 Nov. 16, 2006

(30) Foreign Application Priority Data

May 3, 2005 (EP) ..................................... 05300352

(51) Int. Cl.
*H04M 11/00* (2006.01)
(52) U.S. Cl. ...................................................... 455/406
(58) Field of Classification Search ........... 455/405–408
See application file for complete search history.

(56) References Cited

U.S. PATENT DOCUMENTS

| | | | | |
|---|---|---|---|---|
| 6,058,300 A | * | 5/2000 | Hanson | ......................... 455/406 |
| 6,760,417 B1 | | 7/2004 | Wallenius | |
| 7,155,412 B2 | * | 12/2006 | Brown et al. | ................... 705/40 |
| 7,366,495 B1 | * | 4/2008 | Magnotta et al. | ............. 455/406 |
| 2002/0196924 A1 | * | 12/2002 | Dahari | ...................... 379/220.01 |
| 2003/0050044 A1 | * | 3/2003 | Awada et al. | .................. 455/407 |
| 2004/0018829 A1 | * | 1/2004 | Raman et al. | ................. 455/406 |
| 2004/0077332 A1 | * | 4/2004 | Ephraim et al. | .............. 455/405 |
| 2005/0009500 A1 | * | 1/2005 | Ear | .............................. 455/408 |

FOREIGN PATENT DOCUMENTS

| | | |
|---|---|---|
| EP | 1 263 187 A2 | 12/2002 |
| WO | WO 03/091918 | * 11/2003 |
| WO | WO 03/091918 A1 | 11/2003 |

* cited by examiner

*Primary Examiner* — Steven Lim

(57) ABSTRACT

According to one aspect of the present invention, there is provided a method, in a network having access to a billing system, of debiting a subscribers account for a charge-incurring use made by the subscriber of the network, comprising: in response to receiving a request to make a charge-incurring use of the network, requesting authorization from the billing system for the requested use; supplying to the billing system a billing rate identifier indicating a billing rate to be applied for the chargeable use; and indicating to the billing system an amount of time for which the subscribers account is to be debited at the indicated billing rate thereby causing the subscribers account to be debited a corresponding amount, wherein the period between requesting the authorization and indicating an amount of time is less than the indicated amount of time.

13 Claims, 5 Drawing Sheets

NETWORK BILLING

FIELD OF THE INVENTION

The present invention relates generally to the field of communications, and more particularly to the billing for charge-incurring use made of a network.

BACKGROUND OF THE INVENTION

Conventional communication systems, such as telephony systems, typically employ a billing system through which a subscriber or user of the telephony system is billed for any charge-incurring use made of the telephony system. In current telephony systems billing is typically performed on either a post-pay or a pre-paid basis.

In post-pay systems, charge-incurring calls made through the telephony system by a subscriber are collated over a fixed period, such as a month, and the subscriber is invoiced for all charge-incurring use made since the previous invoice was received. In this way the subscriber pays for charge-incurring use made of the telephony system after the use has occurred.

In pre-paid systems, a subscriber maintains a credit in subscriber account, and before any charge-incurring use may be made of the telephony system the balance of the subscriber account is checked. Charge-incurring use may typically only be made whilst the subscriber has a positive account balance. In this way the subscriber pays in advance prior to any charge-incurring use of the telephony system occurring.

In pre-paid systems it is desirable for the subscriber account balance to be updated in substantially real-time so that the account balance held in the billing system accurately accounts for all charge-incurring use made of the telephony system by the subscriber. Any delay in doing so can lead, for example, to unscrupulous subscribers making fraudulent use of the telephony system.

It is also becoming desirable for accounting in post-paid systems to also be performed in substantially real-time, thereby enabling a subscriber to consult, at any time, for example via the Internet, the current billing amount accrued during an accounting period.

Many such conventional billing systems are so-called intelligent network (IN) systems using, for example, SS7 and other IN protocols. Such IN systems were predominantly designed for the billing of charge-incurring telephone voice calls, and are hereinafter referred to as legacy IN billing systems.

Over recent years many new non-voice call services have been introduced by telephony system operators in addition to the ability to make and receive traditional telephone voice calls. For example, in the world of mobile telephony, short message system (SMS) messaging enables subscribers to send and receive short text-based messages. More recent services include data network access services, multimedia messaging (MMS), to name but a few.

The introduction of such new services creates new revenue models for telephony system operators. Some services, such as SMS, are billed on an event basis, whereby each SMS message sent by a subscriber is billed at a predetermined amount. Use of other services, such as access to data networks, is typically billed on a usage basis such as the length of time a connection to a data service is maintained or the amount of data downloaded. Such services may also be billable using a value approach enabling, for example, a file to be downloaded for a predetermined cost, irrespective of the download time or the file size.

Legacy IN billing systems, as mentioned above, were initially designed for the billing of telephone voice calls and are not generally suitable, nor easily adaptable, to handle the billing of the aforementioned new services. Although telephony system operators could upgrade their legacy IN billing systems to newer billing systems which can handle the billing of such new services, the financial investment already made in such legacy IN billing systems deters many operators from doing so. Thus, for the network operators it is desirable to be able use to existing legacy IN billing systems for the billing of new services.

One recently developed technique for billing SMS messages using a legacy IN billing system is for the telephony system to simulate a telephone call on behalf of the subscriber each time a SMS message is sent. Such a simulated call generates IN signaling messages which are sent between a switch and an IN billing system, in the same manner as the IN messages which are exchanged between a switch and an IN billing system when a conventional telephone voice call is made. However, such a simulated call does not lead to the establishment of any trunk connectivity or voice path.

The simulated call is made to a called party number having a predetermined billable rate, and the simulated call lasts for an appropriate duration such that, at the end of the call, the billing amount charged to the subscriber by way of the simulated call equals the amount the network operator wishes to charge for sending of the SMS message. In this way, the billing is achieved by way of a simulated call, thereby enabling legacy billing systems to be used for the billing of some non-telephone call services.

However, one problem with this approach is that a simulated call is made each time use is made of a non-telephone call service. Whilst the simulated call is active, resource is being consumed by both telephony system and the legacy IN billing system, for example since a billing signaling message session is maintained until the simulated call is terminated.

Whilst the duration of such a simulated call may be in the order of several tens of seconds for a low-cost SMS message, the duration may be substantially longer when using other services generating a higher-cost billing amount. Such higher-cost services include sending a premium rate SMS message, downloading a film or music file, and the like. For example, if a subscriber downloads a large software application this may involve a data connection lasting anything from a few seconds up to many tens of minutes or more, and may involve the downloading of large amounts of data. If the telephony system generates a simulated call for billing the use of the data service, this will typically involve a simulated call having a duration substantially the same length of time as the data connection or data transfer. Such a system, whilst indeed enabling billing for such services to be achieved using legacy billing system, uses substantially resources of the telephony system.

A further problem is that the longer a telephone call lasts the greater the probability that the simulated call will be dropped due to network problems, thereby leading to a potential loss of revenue for the telephony system operator. The potential existence of such problems makes it desirable to add in mechanism to handle such eventualities, thereby further increasing the complexity of such systems.

Accordingly, one aim of the present invention is to overcome, or at least alleviate, at least some of the aforementioned problems.

SUMMARY

According to a first aspect of the present invention, there is provided a method, in a network having access to a billing system, of debiting a subscribers account for a charge-incurring use made by the subscriber of the network. The method comprises, in response to receiving a request to make a charge-incurring use of the network, requesting authorization from the billing system for the requested use; supplying to the billing system a billing rate identifier indicating a billing rate to be applied for the chargeable use; and indicating to the billing system an amount of time for which the subscribers account is to be debited at the indicated billing rate thereby causing the subscribers account to be debited a corresponding amount, wherein the period between requesting the authorization and indicating an amount of time is less than the indicated amount of time.

Advantageously, the length of time of a simulated call may be significantly reduced, since the actual length of the simulated call is shorter than the call length reported to the billing system by the simulated call. This enables the billing system to debit the subscribers account, but without requiring a simulated call having a long duration. Not only does this help reduce the amount of system resources in both the network and the billing system, but it also helps reduce the likelihood of the simulated call being dropped due to network problems, which can lead to inaccurate billing taking place.

Suitably the network is an intelligent network (IN) network and the billing system is an IN billing system.

The step of supplying a billing rate identifier may comprise sending a called party number having a predetermined billing rate associated therewith.

The billing system may be a pre-paid billing or a post-paid billing system.

Where the charge-incurring use is an event-based use, the step of indicating to the billing system may be adapted to occur after receiving a confirmation that the charge-incurring use has completed.

An event-based use may include any one of the sending of short message system SMS message and the sending of a multimedia message service MMS message.

Suitably, the amount debited from the subscribers account corresponds to a predetermined amount for making the event-based use.

Where the charge-incurring use is a prolonged use, the step of indicating to the billing system is preferably adapted to occur around the same time as the chargeable use starts.

The prolonged use may include any one of: downloading a data file, streaming data or a data file and a telephone call.

When the cost of the prolonged use approaches the amount debited from the subscribers account, the method may further comprise requesting a new authorization from the billing system for the continuation of the requested use; supplying to the billing system a billing rate identifier indicating a billing rate to be applied for the chargeable use; and indicating to the billing system an amount of time for which the subscribers account is to be debited at the indicated billing rate thereby causing the subscribers account to be debited a corresponding amount, wherein the period between requesting the authorization and indicating an amount of time is less than the indicated amount of time.

When the prolonged use stops the method further includes determining whether the amount debited from the subscribers account is greater than the amount to be charged for the prolonged use, and where it is so determined, causing the billing system to refund an appropriate amount.

According to a second aspect of the present invention there is provided an intelligent network IN gateway, operable in accordance with any of the above-described method steps.

According to a third aspect of the present invention there is provided an intelligent network having an IN gateway as described above.

According to a fourth aspect of the present invention there is provided a method of causing a billing system to debit a subscribers account for a charge-incurring use made of a network. The method comprising establishing a simulated call with the billing system in response to the charge-incurring use, the simulated call having a duration and causing the reporting of that duration to the billing system to thereby effectuate the debiting of the subscribers account, wherein the reported duration is greater than the actual duration of the simulated call.

Where the charge-incurring use is a prolonged use, and where the cost of the prolonged use approaches the amount debited from the subscribers account, the method may further comprise establishing a new simulated call with the billing system in response to the continuation of the charge-incurring use, the simulated call having a duration and causing the reporting of that duration to the billing system to thereby effectuate the debiting of the subscribers account, wherein the reported duration is greater than the actual duration of the simulated call.

BRIEF DESCRIPTION OF THE DRAWINGS

Various embodiments will now be described, by way of non-limiting example only, with reference to the accompanying diagrams, in which.

DETAILED DESCRIPTION

Figure 1:
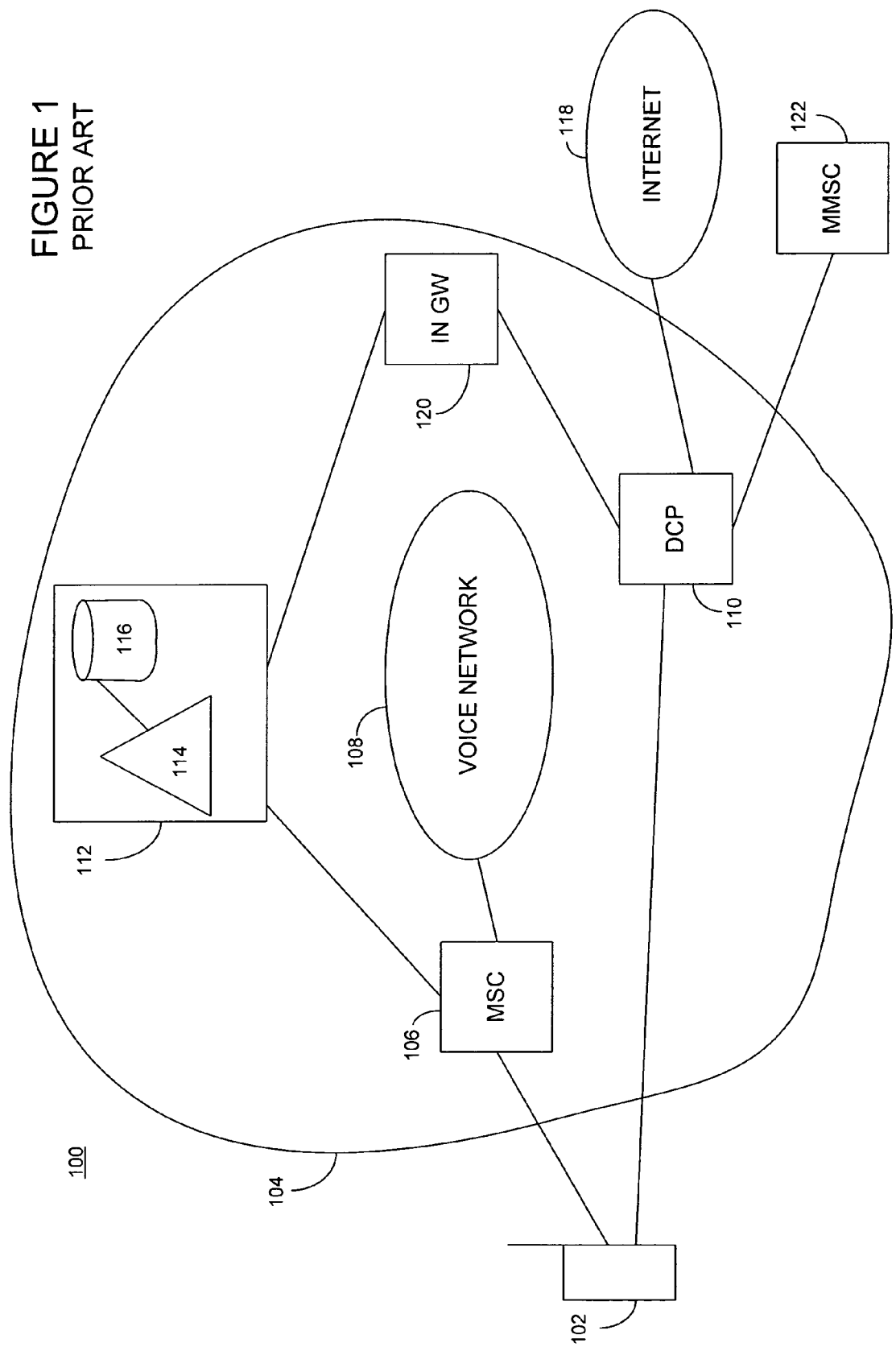
FIG. 1 is a block diagram showing an overview of a simplified network according to the prior art.

Referring now to FIG. 1, there is shown a block diagram showing a simplified view of a telecommunications system 100 according to the prior art. The telecommunications system 100 comprises a telephony network 104 which enables a user of a mobile communication device 102, such as a mobile telephone, to make and receive telephone calls and access additional services available through the network 104. Such additional services may include a short message system (SMS) messaging service, a multimedia messaging service (MMS), access to a data network, such as the Internet 118, and the like.

The user of the mobile device 102 is a subscriber to the telecommunications network 104 and has a pre-paid account, details of which are stored in a legacy IN billing system 112. The legacy IN billing system 112 includes a service control point 114 and a database 116 containing details of account balances, amongst other information, of each subscriber to the network 104.

Figure 2:
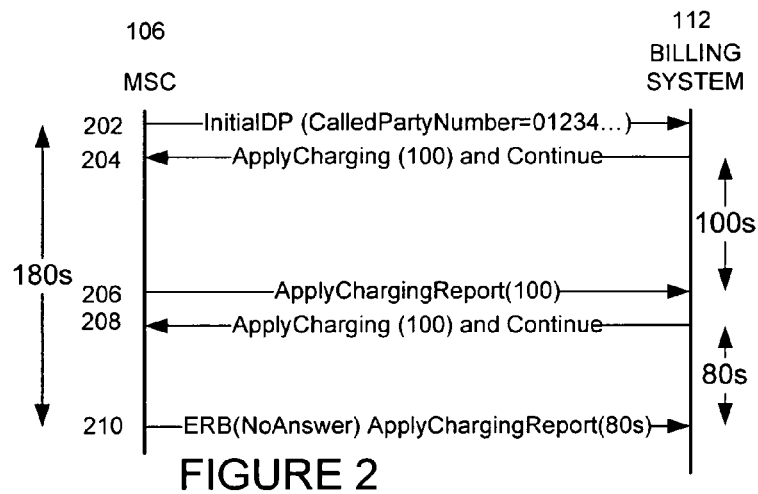
FIG. 2 is a message flow diagram showing example messages which may be sent between various elements of the network of FIG. 1 when a conventional telephone call is made according to the prior art.

FIG. 2 is a message flow diagram showing an example message flow between a mobile switching centre 106 and the billing system 112 in response to a conventional telephone voice call being made by the mobile device 102. The message exchange use an application protocol such as the Camel Application Protocol (CAP) or IN Application Protocol (INAP). For ease of explanation it will be appreciated that only a subset of the actual messages sent are shown. It should also be noted that the message flows used herein for illustration are based upon Apply Charging/Apply Charging Report messages to request reauthorizations to the billing system. Those skilled in the art will appreciate that other equivalent mechanisms may also be used In response to a call establishment request generated by the mobile device 102, the MSC 106 sends an InitialDP message 202 containing the called party number to the legacy IN billing system 112. The legacy IN billing system 112 determines the charging rate applicable to the called party number and determines whether the user has sufficient credit in his account to establish the call. If so, the billing system responds with an ApplyCharging and Continue message 204. The ApplyCharging message 204 reserves an amount of credit in the user's account and contains a time period within which the MSC 106 has to recheck the account balance with the billing system 112. The time period and billing rate correspond to the amount of credit reserved in the user's account.

In response to message 204 the MSC 106 completes the call establishment request in the normal manner.

Whilst the established call is ongoing the MSC 106 periodically checks the account balance within the defined time period by sending an ApplyChargingReport message 206 to the legacy IN billing system 112. The legacy IN billing system 112 responds, if the account balance is sufficient, with a new ApplyCharging and Continue message 208, again authorizing the continuation of the ongoing call for defined period. When the call is terminated by one of the parties the MSC 106 sends an EventReportBCSM message and an ApplyChargingReport, indicating the time since the ApplyChargingReport message 206 was sent, to the legacy IN billing system 112. This enables the billing system to determine how much of the previously reserved credit was used and enables the billing system 112 to debit the user's account balance as necessary.

As shown in FIG. 2, the duration of the charging session, i.e. the time between the initial InitialDP message 202 and the final EventReportBCSM message 210, is substantially the same as the duration of the telephone call to which the billing is applied, as is well known by those skilled in the art. This is because the duration of any telephone call is unknown in advance, and can only be determined when the call is terminated.

According to the prior art, billing in relation to use of some services, such as sending an MMS message, may be made in a similar manner to that described above, through way of a simulated call as described above. Since the amount at which sending an MMS message is to billed is predetermined by the network operator, for example $0.50, this enables a simulated call, as described above, to be established to a predetermined called party number, having a predetermined billing rate, for an appropriate amount of time. For example, to charge a subscriber $0.50 for sending an MMS message a simulated call is made by the IN gateway 120, on behalf of the mobile device 102, to a telephone number having a billing rate of $1 per minute for a duration of 30 seconds. This thus causes the subscriber's account balance to be debited by $0.50.

A more detailed example is given below, with reference to FIG. 3 which is a message flow diagram illustrating example messages which may be sent between various elements of the network 100 during such an operation according to the prior art.

The mobile device 102 sends a request 302 to send an MMS message to the network 100. The MMS message is sent, via a data path of the network 104, to a data control point (DCP) 110. The DCP 110 determines whether the subscriber's account has sufficient credit for sending the MMS message by exchanging messages (not shown) with the IN gateway 120, causing the IN gateway 120 to send an InitialDP message 304 to the legacy IN billing system 112. The InitialDP message 304 contains a called party number having a predetermined billing rate. The legacy IN billing system 112 determines whether the user has sufficient credit and, if so, reserves an amount of credit in the user's account. The billing system 112 responds with an ApplyCharging message 306 containing a time period within which the IN Gateway 120 has to re-obtain authorization from the legacy IN billing system 112. However, since the sending of an MMS message may be considered as an event being quasi-instantaneous (typically having a duration of around 150 ms), such re-authorisation is generally not required.

The DCP 110 submits the MMS message 308 to a multimedia messaging system center (MMSC) 122 which performs the sending of the MMS message to the appropriate destination.

The MMSC 122 confirms the message 308 was correctly received, and acknowledges with an OK message 310 to the DCP 110. The DCP 110 forwards the OK message 311 to the mobile device 102. The IN gateway 120 maintains the established simulated call until it determines that the appropriate amount of time has passed to cause users account to be correctly debited, and ends the simulated call by sending an ApplyChargingReport message 312 containing details of the length of the simulated call to the billing system 112. Receipt of this message by the legacy IN billing system 112 causes the billing system to debit the appropriate amount from the user's account, thereby billing the user sending the MMS message 302. Using the above example, if sending an MMS message is billed at $0.50, the called party number contained in the InitialDP message 304 may have a billing rate of $1 per minute, in which case the simulated call lasts 30 seconds, and the amount of time reported in the ApplyChargingReport message 312 is also 30 seconds.

Figure 3:
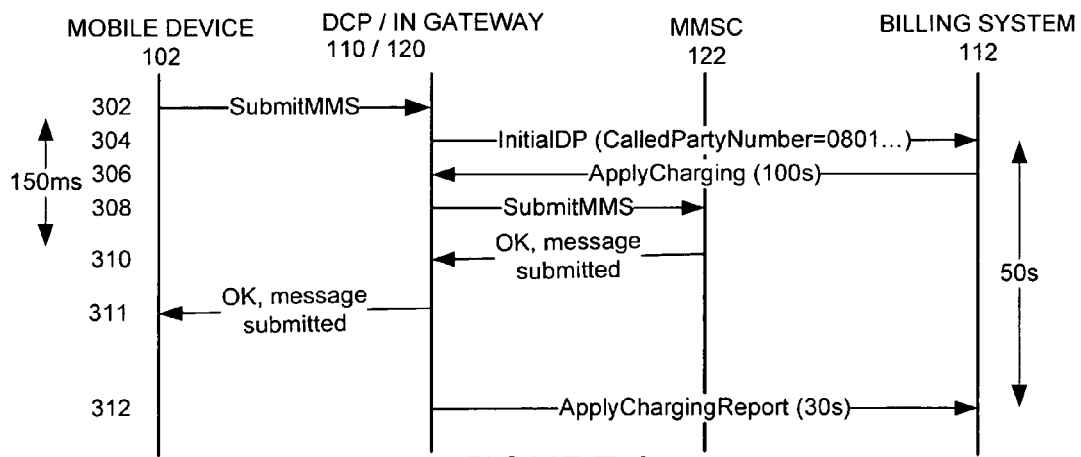
FIG. 3 is a message flow diagram showing example messages which may be sent between various elements of the network of FIG. 1 when an MMS message is sent, according to the prior art.

It is to be noted, as shown in FIG. 3, that the sending of the MMS messages lasts around 150 ms, whereas the simulated call is maintained for 30 seconds. Hence, the length of the simulated call is many times the length of the event. This leads not only to increased use of network resources, but also increases the risk of interruptions in the billing process through network problems.

A further problem is that the above-described techniques are unsuitable for the billing of use of services which have a more prolonged duration, such as the downloading of a music or video file, since the simulated call needs to be maintained for the whole duration of the download, which could last a significant length of time.

Figure 4:
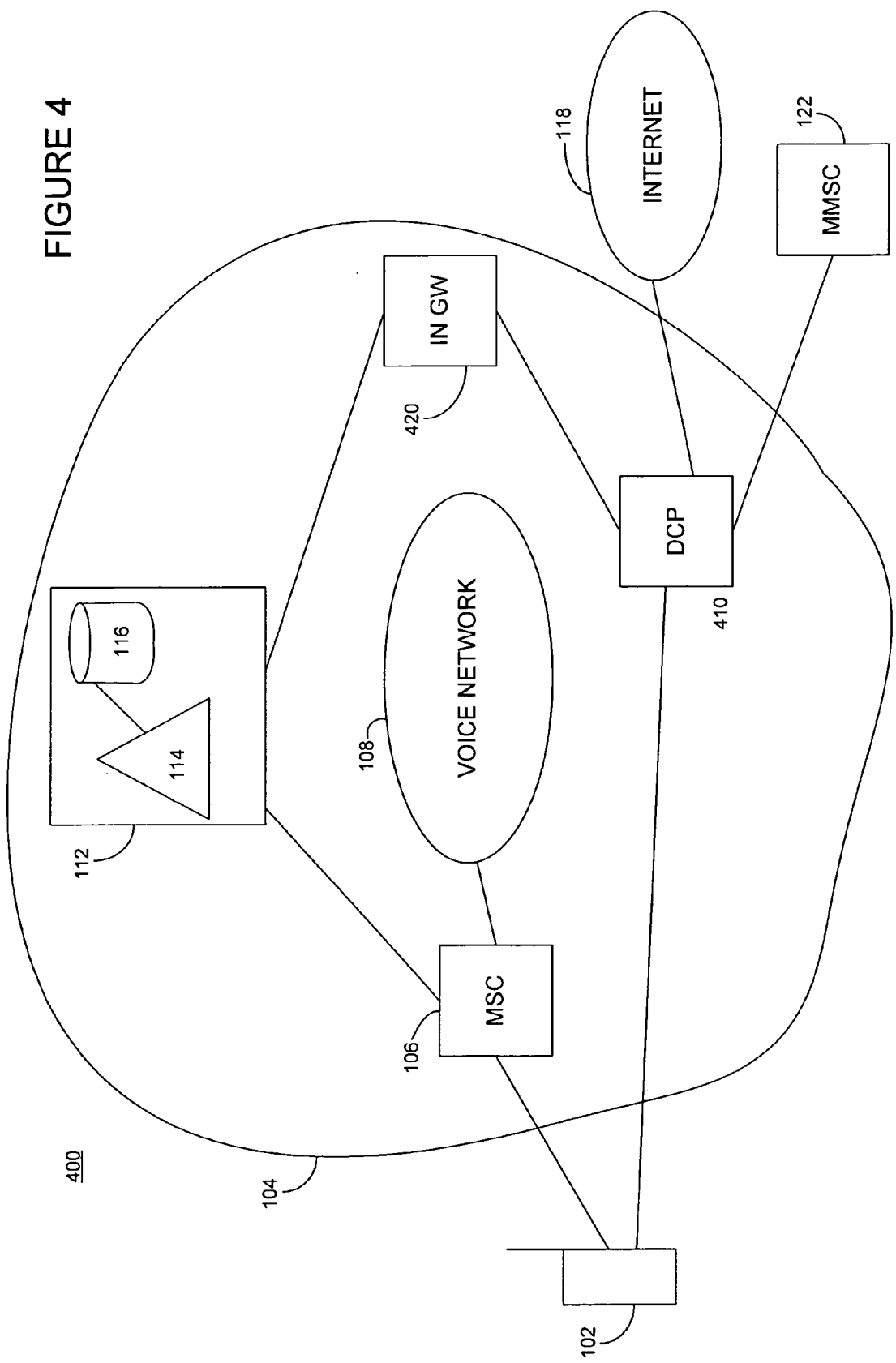
FIG. 4 is a block diagram showing an overview of a simplified network according to an embodiment of the present invention.

An embodiment of the present is now described with reference to FIG. 4 which shows a block diagram of a telecommunications system 400 according to the present embodiment. The network 400 is similar to the network 100 shown in FIG. 1 and like numerals are used to indicate like elements. The network 400 includes a modified DCP 410 and IN gateway 420, the operation of which is described in more detail below. The legacy IN billing system 112, however, is unchanged.

Figure 5:
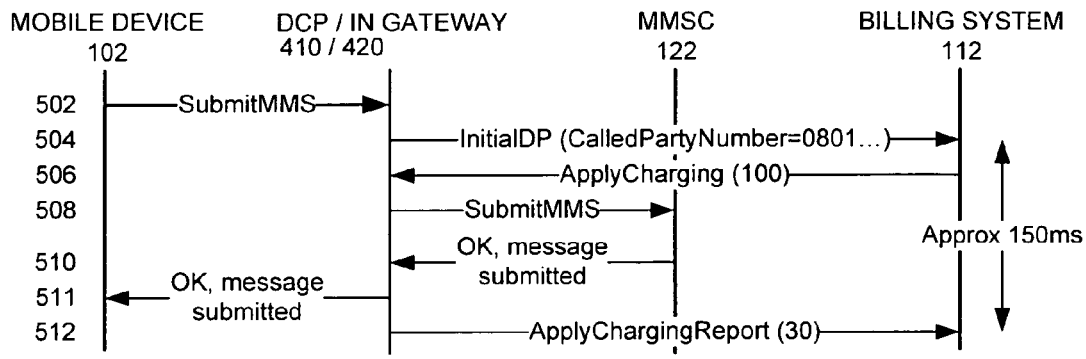
FIG. 5 is a message flow diagram showing example messages which may be sent between various elements of the network of FIG. 4 when an MMS message is sent, according to an embodiment of the present invention.

Operation of the network 400 will be described with additional reference to FIG. 5 which is a message flow diagram illustrating example messages which may be sent between various elements of the network 400 according to the present embodiment.

The user of the mobile device 102 sends an MMS message 502 in the normal manner. The mobile device 102 sends the MMS message 502 to the DCP 410 which, as described above in relation to the prior art, causes the IN gateway 420 to send an InitialDP message 504 to the billing system 112. The InitialDP message 504 includes a called party number having a predetermined billing rate. Preferably the called party number has a billing rate which is not affected by any subscription options or promotions which may be applicable to the subscribers account. In this way, the IN gateway 420 knows that the billing rate applicable to the called party number is the actual billing rate applied by the legacy IN billing system 112.

If the user account has sufficient credit the billing system 112 reserves an amount of credit, for example 100 seconds worth at the billable rate for the called party number, and responds with an ApplyCharging message 506 indicating that the IN gateway 420 must recheck the user's account balance within 100 seconds.

The DCP 410 forwards the MMS message 508 to the MMSC 122 and the MMSC 122 acknowledges reception of the MMS message with OK message 510 sent back to the DCP 410 and forwarded thereby to the mobile device 102 as OK message 511.

In response to receiving the OK message 510, the DCP 410 causes the IN gateway 420 to send an ApplyChargingReport message 512 to the legacy IN billing system 112. The ApplyChargingReport message 512 is configured by the IN gateway 420 to contain a predetermined number of seconds to cause the legacy IN billing system 112 to debit the user's account with the correct amount for sending an MMS message. For example, if the amount to bill for sending an MMS message is $0.50, and the billing rate for the called party number indicated in the InitialDP message 504 is $1 per minute, the ApplyChargingReport message 510 will report the call duration as 30 seconds.

It should be noted, however, that in the present embodiment the length of time reported in the ApplyChargingReport message 512 does not correspond to the actual length of time of the simulated call. As indicated on FIG. 5, the duration of the simulated call, i.e. the length of time between the initial InitialDP message 504 and the final ApplyChargingReport message 512, may be in the order of several hundred milliseconds, whereas the length of time reported in the ApplyChargingReport message 512 may be in the order of one or tens, or even hundreds, of seconds. Thus, in the present embodiment, the period of time reported by the IN gateway 420 in the ApplyChargingReport message 512 is not equal to the length of time between the InitialDP message 504 and the ApplyChargingReport message 512, as is the case in the prior art. The present embodiment thereby leads to a shortening of the simulated call duration compared to the prior art. The reduction of simulated call duration can be significant in many cases.

One advantageous result of achieving a shortening of the simulated call length is to reduce the amount of system resource required for the simulated call.

Figure 6:
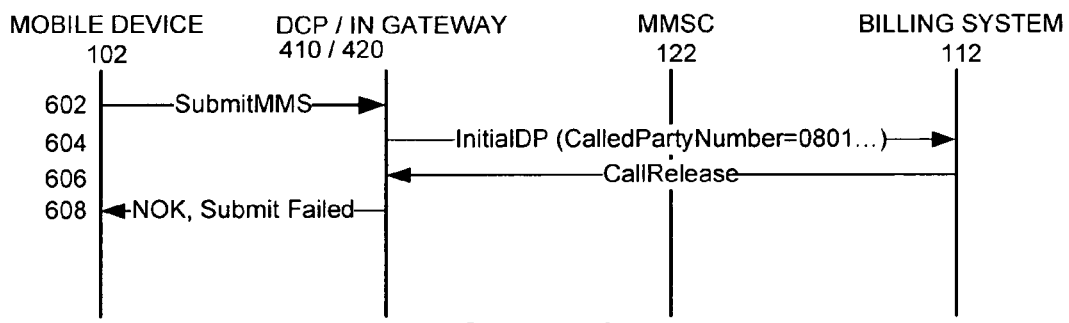
FIG. 6 is a message flow diagram showing example messages which may be sent between various elements of the network of FIG. 4 when an MMS message is sent when a subscriber has insufficient credit.

FIG. 6 shows example messages which may be sent between various elements of the network 400 when the user of the mobile device 102 attempts to send an MMS message when his account balance is insufficient. The mobile device 102 submits the MMS message 602 to the DCP 410 in the normal manner. The DCP 410 causes the IN gateway 420 to send an InitialDP message 604 to the billing system 112 to determine whether the user has sufficient credit to send the MMS message. In this example, since the user has insufficient credit, the billing system 112 responds to the IN gateway 420 with a call release message 606 terminating the simulated call. The IN gateway notifies this to the DCP 410 and sends a NOK, Submit Failure message 608 to the mobile device 102.

Figure 7:
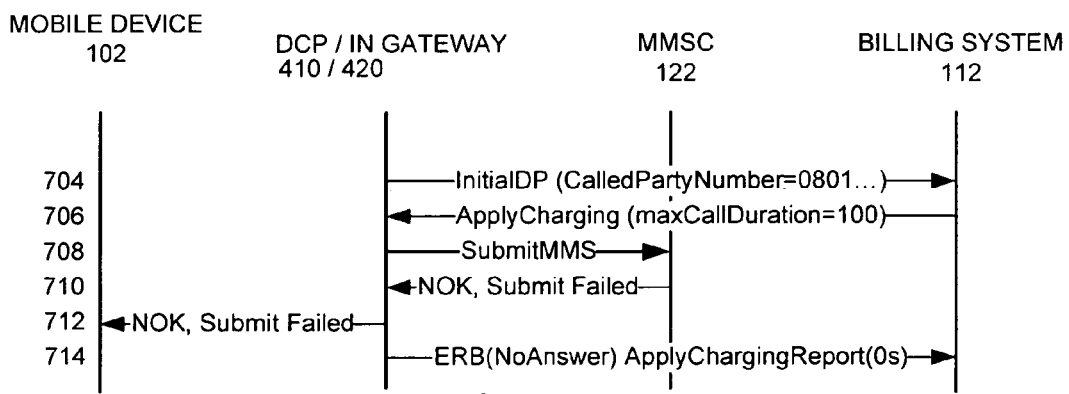
FIG. 7 is a message flow diagram showing example messages which may be sent between various elements of the network of FIG. 4 when an MMS message is sent when the MMS message sending fails.

FIG. 7 shows example messages which may be sent between various elements of the network 400 when an MMS message sent by the user of the mobile device 102 fails to be sent by the MMSC 122. The mobile device 102 submits the MMS message 702 to the DCP 410 as described above. The DCP 410 causes the IN gateway 420 to send an InitialDP message to the billing system 112 to check whether the user has sufficient credit to enable the MMS message to be sent. The legacy IN billing system 112 responds by reserving an amount of credit and responds with an ApplyCharging message 706. The DCP 410 forwards the MMS message 708 to the MMSC 122. If the message sending fails, the MMSC 122 responds to the DCP 410 with a NOK message 710. This message is forwarded to the mobile device 102 as message 712. The DCP 410 causes the IN gateway 420 to send an ERB message and an ApplyChargingReport message 710 to the billing system indicating that the number of seconds to be billed for is zero. This prevents the billing system 112 from debiting the user's account balance for the unsuccessful delivery of the MMS message.

A further embodiment is now described which provides a mechanism by which the aforementioned shortened simulated calls may be used in the billing of prolonged charge-incurring use, such as the downloading of a music file or a film over a data network. In the following example it is assumed that billing of the downloaded file is based on the size. Additional reference is made to FIG. 8.

The user of the mobile device 102 requests to download a file, such as music file, from a HTTP download server (not shown), accessible through the Internet 118, and having a specified universal resource indicator (URI) provided by the user. In the present example, the size of the downloaded file is 75 Mb and downloading a charged at $2 per 50 Mb chunk.

The download request 802, which may be for example in the form of a file transfer protocol (FTP) download request, is received by the DCP 410.

The DCP 410 sends a request message 804 to the IN gateway to obtain authorisation, via the legacy IN billing system 112, for an initial download capacity, for example 50 Mb. To do this the IN gateway 420 sends an InitialDP message 806 to the legacy IN billing system 112. The InitialDP message includes a called party number to which is applicable a predetermined billing rate, which in the present example is $2 per minute. If the user has sufficient credit available the legacy IN billing system 112 reserves an amount of credit and responds to the IN gateway 420 with an ApplyCharging message 808 indicating an amount of time at the indicated billing rate that is authorized. It will be appreciated that since the billing system 112 may be configured to authorize and reserve a billing amount corresponding to a predetermined amount of time at the indicated billing rate, that the amount of time reported in the ApplyCharging message 808 may equate to more or less than the initially requested 50 Mb capacity.

The IN gateway 420 sends a confirmation message 810 to the DCP 410 indicating that the download may start 812. Following this message the DCP 410 causes the IN gateway 420 to send an ApplyChargingReport message 814 to the billing system 112. The ApplyChargingReport message, although being sent only a short time after the initial InitialDP message 806, indicates that the simulated call lasted for 60 seconds, thereby causing the legacy IN billing system 112 to debit the users account by $2, which corresponds to the cost of downloading 50 Mb of data. It should be noted that at this point the users account has been debited for a download which has not yet taken completed.

Figure 8:
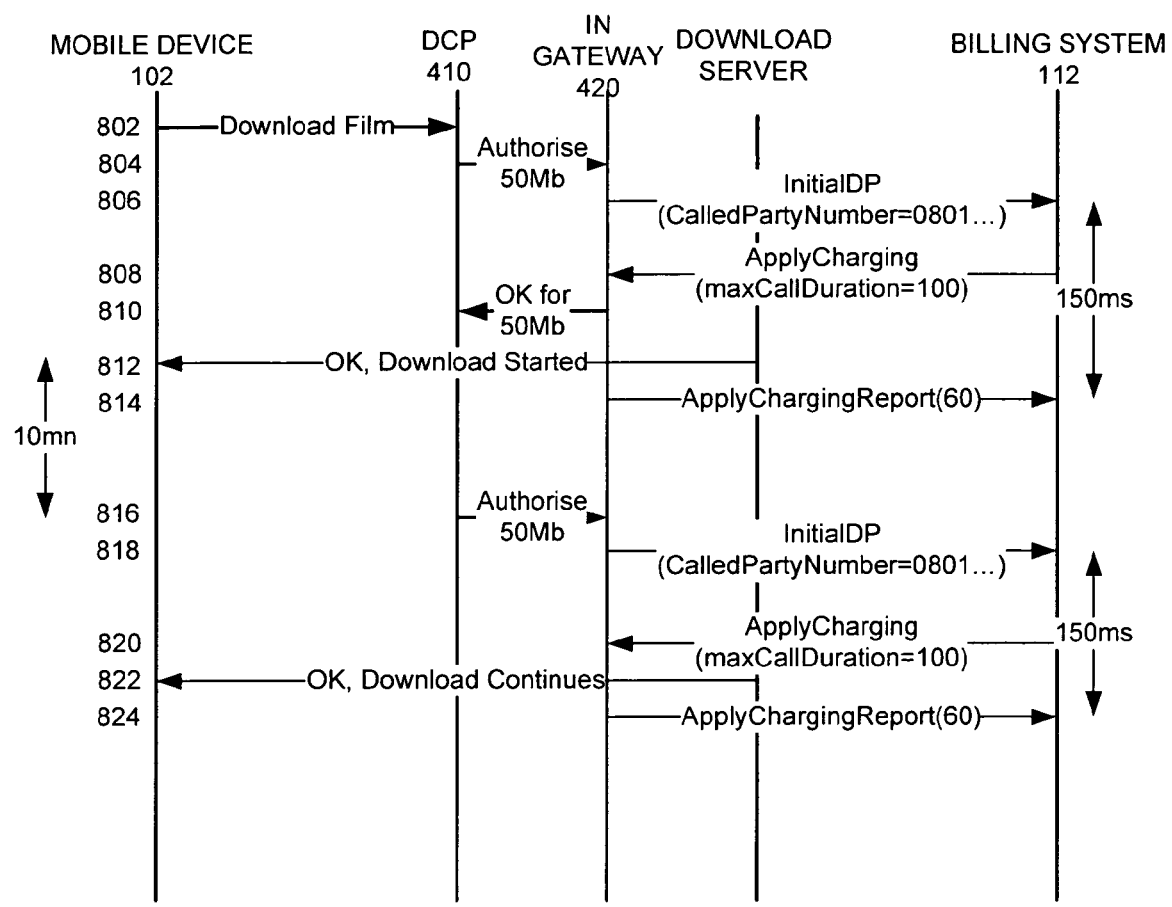
FIG. 8 is a message flow diagram showing example messages which may flow between various elements of the network of FIG. 4 when a data file is downloaded, according to an embodiment of the present invention.

The download of the requested file is started, via the DCP 410, to the mobile device 102. In FIG. 8 the download is shown as starting prior to the ApplyChargingReport message 814 being sent to the legacy IN billing system 112, however it will be apparent that the downloading may alternatively start at the same time, or after the ApplyChargingReport message 814 is sent depending on particular configurations. In any case it is preferable that the download starts around the same time as ApplyChargingReport message 814 is sent.

The DCP 410 includes a data counter (not shown) which enables the amount of data downloaded to the mobile device 102 to be measured. As the previously agreed 50 Mb download limit is reached, shown on FIG. 8 as taking 10 minutes, the DCP again sends a request message 816 to the IN gateway 420 to check whether the user still has sufficient balance in his account to continue the download and to use a further 50 Mb of download. The IN gateway 420 sends a new InitialDP message 818 to the billing system 112. In response thereto the legacy IN billing system 112 checks the user's account balance, and if sufficient credit is still available it reserves an amount of credit in the user's account and responds to the IN gateway 420 with an ApplyCharging message 820. The IN gateway 420 indicates the reception of this message to the DCP 410 enabling the download to continue uninterrupted 822. Following this message the IN gateway 420 sends an ApplyChargingReport message 824 to the billing system 112. As previously, although the ApplyChargingReport message 824 is sent only a short time after the initial InitialDP message 818, it indicates that the length of simulated call was 60 seconds, thereby causing the legacy IN billing system 112 to debit the users account by a further $2 corresponding to the cost of downloading 50 Mb of data. Again, it should be noted that at this point the users account has been debited in advance of the download capacity paid for being used.

When the 75 Mb file has been download has the DCP 110 detects the end of the download, for example by detecting that no data has been downloaded for a predetermined period of time, thereby indicating the end of the download. In the present embodiment the user is charged for downloading 100 Mb of data, even where only 75 Mb of data has been downloaded.

In a further embodiment, depending on the size of the file to download the chunk size (in the previous example 50 Mb) may be reduced to provide a better granularity, and thereby reducing the chance that the user will be billed for downloading 100 Mb of data, when only 2 Mb of data is downloaded. For example, by reducing the chunk size to 1 Mb enables the subscriber to be billed in chunks of 1 Mb.

In a yet further embodiment, when the download has completed the DCP 410 causes the IN gateway 420 to send an ApplyChargingReport message 824 to the legacy IN billing system 112. The ApplyChargingReport message 824 includes an amount of time for which the additional download period is to be billed, this period being no more than the amount chargeable for a 50 Mb download. If the reported amount of time is less, the legacy IN billing system is able to refund to the users account the unused portion of the 50 Mb download. Such a refund may be achieved, for example, by making a simulated call to a called party number having a negative charging rate, thereby causing the subscribers account to be credited.

The type of content being downloaded may affect the way in which the download is billed. For example, if the user is downloading or a streaming data such as an audio of video data, if the download is stopped before the end of the audio or video track it is reasonable that the user be billed for the part of the audio or video data already streamed. However, if the user is downloading a software application, it may be appropriate to only bill the user if the whole of the download is successfully completed.

Although the above described embodiments relate to the billing of non-telephone voice calls using a shortened simulated call, the same techniques could also be applied for the billing of conventional telephone voice calls in a similar manner as described above with reference to FIG. 8. For example, when a conventional voice call is made an ApplyChargingReport message may be sent by the switch to the legacy IN billing system as soon as the call is connected indicating a predetermined length of time, and thereby causing the legacy IN billing system to debit the users account in advance. When the call is terminated the switch indicates correctly the length of time the call lasted to the legacy IN billing system and any adjustments necessary to the balance may be made. For example, a refund to the billing system could be made as described above.

Again, use of such techniques as described above may be used to reduce the amount of resources required by a telephony system and legacy IN billing system by reducing the length of time billing sessions last.

The invention claimed is:

1. A method, in a network having access to a billing system, of debiting a subscriber's account for a charge-incurring use made by the subscriber of the network, comprising:
    receiving, by an intelligent (IN) gateway, a request to make a charge-incurring use of a network;
    establishing, in response to the receiving, a simulated call with a billing system, the establishing of a simulated call comprising:
        requesting authorization from the billing system for the requested use; and
        supplying to the billing system a billing rate identifier indicating a billing rate to be applied for the charge-incurring use; and
    indicating to the billing system an amount of time for which the subscribers account is to be debited at the indicated billing rate thereby causing the subscriber's account to be debited a corresponding amount,
    wherein the period between requesting the authorization and indicating an amount of time is less than the indicated amount of time, and
    wherein the indicated amount of time reported to the billing system is not calculated from a period of time between requesting the authorization and indicating the amount of time to the billing system.

2. The method of claim 1, wherein the network is an intelligent (IN) network and the billing system is an IN billing system.

3. The method of claim 1, wherein the step of supplying a billing rate identifier comprises sending a called party number having a predetermined billing rate associated therewith.

4. The method of claim 1 wherein the billing system is a pre-paid billing or a post-paid billing system.

5. The method of claim 1, wherein, where the charge-incurring use is an event-based use, the step of indicating to the billing system being adapted to occur after receiving a confirmation that the charge-incurring use has completed.

6. The method of claim 5, wherein the event-based use includes anyone of the sending of short message system SMS message and the sending of a multimedia message service MMS message.

7. The method of claim 5, wherein the amount debited from the subscriber's account corresponds to a predetermined amount for making the event-based use.

8. The method of claim 1, wherein the charge-incurring use is a prolonged use, and the indicating to the billing system of an amount of time for which the subscribers account is to be debited occurs substantially at a same time as a start time of the charge-incurring use.

9. The method of claim 8, wherein the prolonged use includes one of: downloading a data file, streaming data or a data file and a telephone call.

10. The method of claim 8, further comprising, when the cost of the prolonged use approaches the amount debited from the subscriber's account:
   requesting a new authorization from the billing system for the continuation of the requested use;
   supplying to the billing system a billing rate identifier indicating a billing rate to be applied for the charge-incurring use; and
   indicating to the billing system an amount of time for which the subscriber's account is to be debited at the indicated billing rate thereby causing the subscriber's account to be debited a corresponding amount, wherein the period between requesting the new authorization and indicating an amount of time is less than the indicated amount of time.

11. The method of claim 9,
   determining, when the prolonged use stops, whether the amount debited from the subscriber's account is greater than the amount to be charged for the prolonged use, and
   in response to the determining that the subscriber's account is greater than the amount to be charged for the prolonged use, causing the billing system to refund an appropriate amount.

12. An intelligent network, comprising:
an intelligent (IN) gateway to:
   receive a request to make a charge-incurring use of the network;
   establish a simulated call with a billing system, wherein to establish a simulated call includes to:
      request authorization from the billing system for the requested use; and
      supply to the billing system a billing rate identifier indicating a billing rate to be applied for the chargeable use; and
   indicate to the billing system an amount of time for which the subscribers account is to be debited at the indicated billing rate thereby causing the subscriber's account to be debited a corresponding amount,
   wherein the period between requesting the authorization and indicating an amount of time is less than the indicated amount of time, and
   wherein the indicated amount of time reported to the billing system is not calculated from a period of time between requesting the authorization and indicating the amount of time to the billing system.

13. A method of causing a billing system to debit a subscriber's account for a charge-incurring use made of a network, comprising:
   establishing a simulated call with the billing system in response to the charge-incurring use, the simulated call having a duration;
   reporting the duration to the billing system to effectuate the debiting of the subscriber's account, wherein the reported duration is greater than the actual duration of the simulated call; and
   in response to the cost of the prolonged use approaching the amount debited from the subscriber's account, establishing a new simulated call with the billing system in response to a continuation of the charge-incurring use, the new simulated call having a duration, and reporting the duration of the new simulated call to the billing system to effectuate the debiting of the subscriber's account, wherein the reported duration of the new simulated call is not calculated from the actual duration of the new simulated call.

* * * * *